United States Patent

Sato et al.

[11] Patent Number: 5,913,077
[45] Date of Patent: Jun. 15, 1999

[54] IMAGE READER INCORPORATED IN ELECTRO-DEVELOPING TYPE CAMERA AND ELECTRO-DEVELOPING RECORDING MEDIUM USED THEREIN

[75] Inventors: Koichi Sato; Yasuhiro Yamamoto; Tahei Morisawa; Masato Okabe; Hironori Kamiyama; Osamu Shimizu; Yuudai Yamashita, all of Tokyo, Japan

[73] Assignees: Asahi Kogaku Kogyo Kabushiki Kaisha; Dai Nippon Printing Co., Ltd., both of Tokyo, Japan

[21] Appl. No.: 08/733,138

[22] Filed: Oct. 16, 1996

[30] Foreign Application Priority Data

Oct. 16, 1995 [JP] Japan ................................. 7-293668
May 1, 1996 [JP] Japan ................................. 8-134245

[51] Int. Cl.⁶ .................................................. G03B 17/50
[52] U.S. Cl. ............................................ 396/30; 358/506
[58] Field of Search .................................. 358/487, 506, 358/461; 348/251; 396/30, 429

[56] References Cited

U.S. PATENT DOCUMENTS

| | | |
|---|---|---|
| 4,633,073 | 12/1986 | Horikawa . |
| 4,845,551 | 7/1989 | Matsumoto ............................... 358/80 |
| 4,922,335 | 5/1990 | Outa et al. ................................ 358/80 |
| 5,315,410 | 5/1994 | Takanshi et al. . |
| 5,408,341 | 4/1995 | Takanashi et al. . |
| 5,412,489 | 5/1995 | Hirota ..................................... 358/461 |
| 5,414,535 | 5/1995 | Kanmoto et al. ........................ 358/487 |
| 5,424,156 | 6/1995 | Aoki et al. . |
| 5,457,547 | 10/1995 | Yamada ................................... 358/487 |
| 5,500,745 | 3/1996 | Iishiba et al. ............................ 358/461 |
| 5,555,205 | 9/1996 | Okabe ..................................... 365/108 |
| 5,748,341 | 5/1998 | Morikawa ............................... 358/488 |

FOREIGN PATENT DOCUMENTS

| | | |
|---|---|---|
| 0622954 | 11/1994 | European Pat. Off. . |
| 59-155809 | 9/1984 | Japan . |
| 5-2280 | 1/1993 | Japan . |
| 5-165005 | 6/1993 | Japan . |
| 6-130347 | 5/1994 | Japan . |
| 6-313894 | 11/1994 | Japan . |
| 7-13132 | 1/1995 | Japan . |

*Primary Examiner*—Safet Metjahic
*Assistant Examiner*—John Chizmar
*Attorney, Agent, or Firm*—Greenblum & Bernstein P.L.C.

[57] ABSTRACT

An image reader to optically and electronically read a developed image of an electro-developing recording medium, where the electro-developing recording medium has a reference zone exhibiting a substantially-constant transparency. An optical sensor senses light rays passing through the reference zone, and converts the sensed light rays into optical data. Correction data is prepared based on the optical data. Image data is read from the developed image of the electro-developing recording medium according to the correction data. The correction data is updated whenever the image data is read from the developed image of the electro-developing recording medium. The electro-developing recording medium includes an electrostatic information recording medium and an electric charge keeping medium, and the electric charge keeping medium has a reference zone exhibiting a constant transparency.

13 Claims, 11 Drawing Sheets

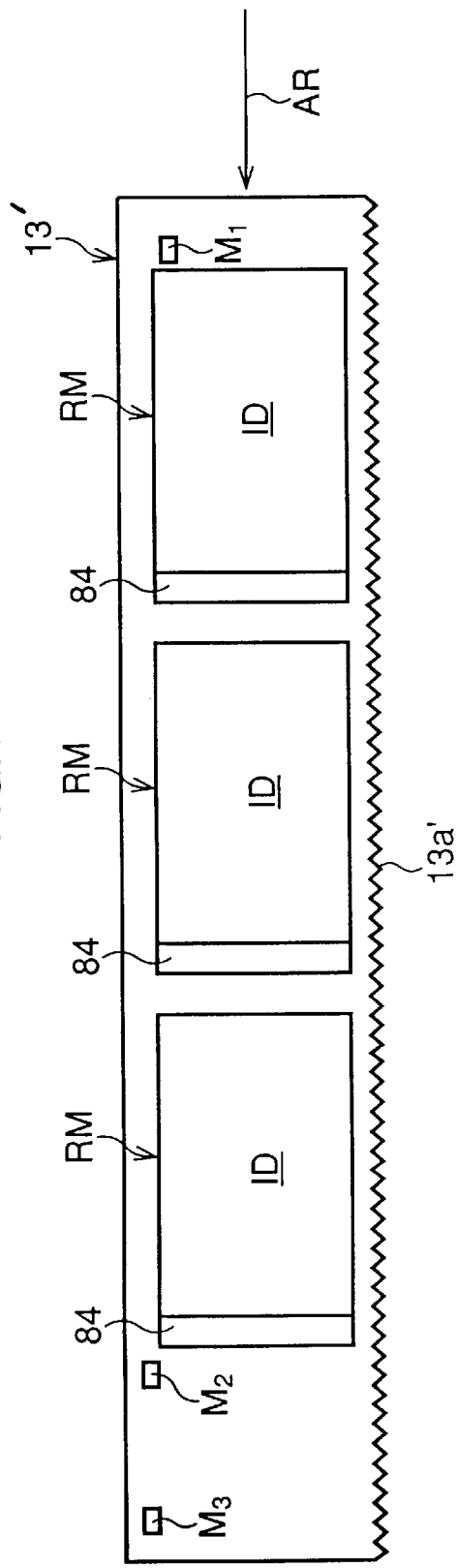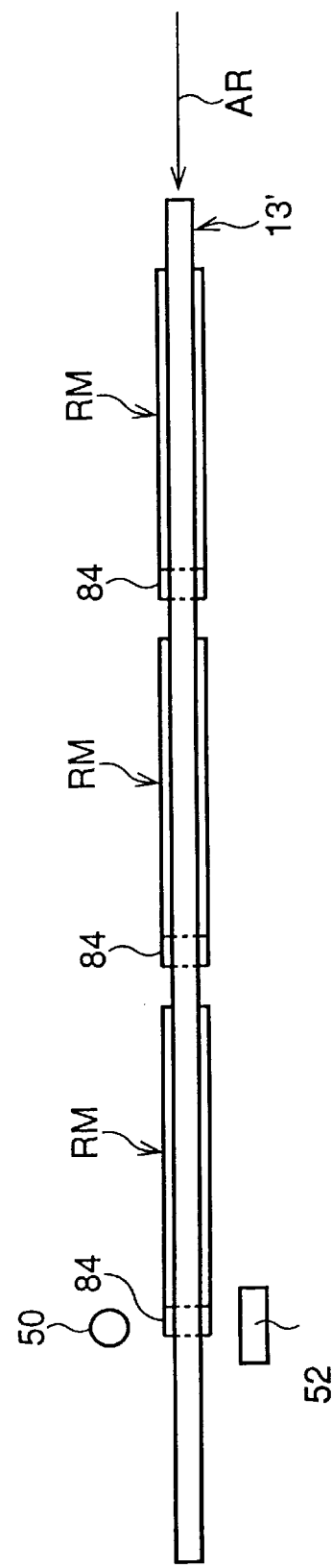

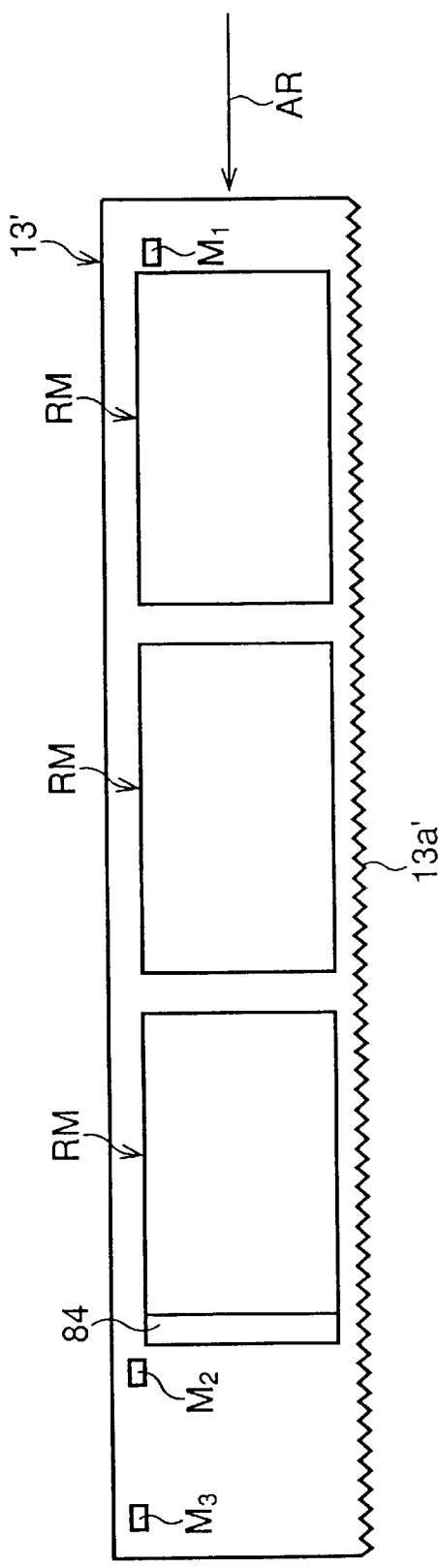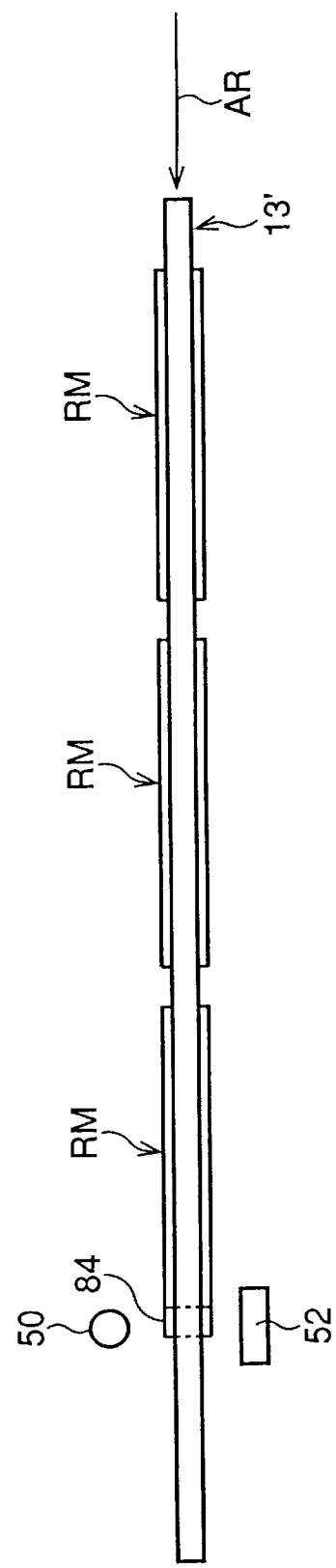

IMAGE READER INCORPORATED IN ELECTRO-DEVELOPING TYPE CAMERA AND ELECTRO-DEVELOPING RECORDING MEDIUM USED THEREIN

BACKGROUND OF THE INVENTION

1. Field of the Invention

The present invention relates to an image reader incorporated in an electro-developing type camera and an electro-developing recording medium used therein, in which medium an optical image obtained through a photographing lens system is electronically and directly recorded and developed as a visible image in a short period of time.

2. Description of the Related Art

The electro-developing recording medium per se is known. For example, Japanese Unexamined Patent Publication No. 5-2280 and U.S. Pat. No. 5,424,156 disclose one type of electro-developing recording medium comprising an electrostatic information recording medium and an electric charge keeping (or holding) medium. The electrostatic information recording medium includes a photoconducting layer and an inorganic oxide material layer, and the electric charge keeping medium includes a liquid crystal display, both of the mediums being combined to face each other with a small gap therebetween.

An electro-developing type camera using the electro-developing recording medium is also known, and is referred to as an electro-developing type camera hereinafter.

In a photographing operation of the electro-developing type camera, a voltage is applied to the electro-developing recording medium. An optical image is formed on a light receiving surface of the electrostatic information recording medium by a photographing optical system, during the application of the voltage to the electro-developing recording medium. An electric charge distribution is produced over the electrostatic information recording medium in accordance with a light intensity distribution of the optical image formed on the light receiving surface thereof. Accordingly, the intensity of an electric field acting on the liquid crystal of the electric charge keeping medium is in accordance with the electric charge distribution. Thus, the optical image is reproduced in the electric charge keeping medium as a visible image. Namely, as soon as the optical image is formed on the electrostatic information recording medium, the optical image is recorded and developed in the electric charge keeping medium.

Japanese Unexamined Patent Publication No. 5-165005 discloses another type of electro-developing recording medium. In this type medium, a structure of the electrostatic information recording medium is substantially the same as that of the electrostatic information recording medium as disclosed in the above-mentioned citations except that the inorganic oxide material layer is omitted therefrom, and that the electric charge keeping medium or liquid crystal display is a liquid-crystal-polymer composite (LCPC) using a memory type of liquid crystal such as smectic liquid crystal. Similar to the first-mentioned type of electro-developing recording medium, both the electrostatic information recording medium and the electric charge keeping medium are combined to face each other with a small gap therebetween.

Furthermore, Japanese Unexamined Patent Publications No. 6-130347 and No. 7-13132 disclose yet another type of electro-developing recording medium. In this type of medium, the inorganic oxide material layer is also omitted from the electrostatic information recording medium, and the electric charge keeping medium or liquid crystal display is also a liquid-crystal-polymer composite (LCPC) using the memory type liquid crystal. Nevertheless, both the electrostatic information recording medium and the electric charge keeping medium are integrally combined with each other through the intermediary of a transparent insulating layer without any gap therebetween.

When the electric charge keeping medium is a memory-type liquid crystal display using, for example, a smectic liquid crystal, the developed visible image can be kept therein even if the electric field is eliminated from the electro-developing recording medium. Thus, the electro-developing recording medium carrying the developed visible image can be preserved in the same manner as slides or transparency sheet films. Also, in the memory type liquid crystal display, the developed image can be erased by heating it to a given temperature. In this case, the same electro-developing recording medium can be repeatedly used for photographing.

When the electro-developing type camera as mentioned above is constructed as an electronic still video camera, there is necessarily provided an image reader for optically and electronically reading a recorded and developed image of the electro-developing recording medium.

In particular, the image reader may comprise a linear light source, a focussing optical system, and a linear solid image sensor such as a one-dimensional CCD (charge-coupled device) image sensor which are aligned with each other. The electro-developing recording medium is relatively and intermittently moved with respect to the image reader such that the electro-developing recording medium passes through a space between the light source and the focussing optical system. Namely, a developed image of the electro-developing recording medium is scanned with light rays emitted from the light source during the relative and intermittent movement of the electro-developing recording medium. The light rays passing through the developed image are focussed by the focussing optical system on a light receiving surface of the solid image sensor, in which the read image is converted into image pixel signals.

The image pixel signals obtained from the image sensor may be processed in various ways. For example, the read pixel signals may be stored in a second recording medium such as an IC memory card, a floppy disk, hard disk, or the like. Also, the read image signals may be transferred to from the camera to an external processing device such an a computer, a TV monitor, and so on.

The light source of the image reader may include an LED (light emitting diode) array, a fluorescent lamp, or the like. As with all types of light sources, it is impossible to uniformly illuminate the developed image of the electro-developing recording medium, due to a shading of the light source. Accordingly, the image pixel signals obtained from the image sensor must be subjected to a shading correction in accordance with shading characteristics of the light source.

Also, as is well known, the solid image sensor of the image reader includes a plurality of photoelectric-conversion elements such as photodiodes, but these individual elements exhibit different photoelectric-conversion characteristics. Accordingly, the image pixel signals obtained from the image sensor should be further corrected in accordance with the different characteristics of the photoelectric-conversion elements of the image sensor.

Furthermore, individual products of the electro-developing recording medium as mentioned above exhibit different transparency characteristics. In particular, a transparency characteristic of the electrostatic information recording medium and a transparency characteristic of the electric charge keeping medium varies among the individual products of the electro-developing recording medium. Accordingly, the image pixel signals obtained from the image sensor must be corrected in accordance with the different characteristics of the products of the electro-developing recording medium.

Before the corrections mentioned above can be properly carried out, correction data must be prepared on the basis of an actual measurement of the shading characteristic of the light source, the different characteristics of the photoelectric-conversion elements of the image sensor, and the different transparency characteristics of the products of the electro-developing recording medium.

Nevertheless, the correction data is relative (not absolute), because the shading characteristic of the light source, the different characteristics of the photoelectric-conversion elements of the image sensor per se, and the different transparency characteristics of the products of the electrostatic recording medium are subjected to a deviation not only due to age-deterioration of the light source and the image sensor, but also due to a change in environmental factors, especially temperature.

Thus, even if a setting or the correction data is previously carried out, a proper shading correction of the light source, a proper photoelectric-conversion correction of the image sensor, and a proper transparency correction of the electro-developing recording medium cannot be ensured.

SUMMARY OF THE INVENTION

Therefore, an object of the present invention is to provide an image reader incorporated in an electro-developing type camera and including a light source and an image sensor to optically and electronically read a developed image of an electro-developing recording medium, wherein correction data for a shading correction of the light source, a photoelectric-conversion correction of the image sensor, and a transparency correction of the electro-developing recording medium can be prepared anew or revised whenever the reading of the developed image from the electro-developing recording medium is carried out.

Another object of the present invention is to provide an electro-developing recording medium which enables revision of the correction data in the image reader as mentioned above.

In accordance with a first aspect of the present invention, an image reader is provided for optically and electronically reading a developed image of an electro-developing recording medium having a reference zone exhibiting a substantially-constant transparency. The image reader comprises an optical sensor for sensing light rays passing through the reference zone, and for converting the sensed light rays into optical data. A preparation device for preparing correction data based on the optical data, and a correction device for correcting image data, read from the developed image of the electro-developing recording medium, based on the correction data, wherein the correction data is revised whenever the image data is read from the developed image of the electro-developing recording medium.

Preferably, the optical sensor is used to optically and electronically read the developed image of the electro-developing recording medium. The reference zone may be located at a leading side edge of an image recording area of the electro-developing recording medium in a reading direction in which the electro-developing recording medium is intermittently moved with respect to the optical sensor during the optical and electronic reading of the developed image by the optical sensor.

In accordance with a second aspect to the present invention, an image reader is provided for optically and electronically reading a developed image of an electro-developing recording medium having a reference zone exhibiting a substantially-constant transparency. The reader comprises an optical sensor for sensing light rays passing through the reference zone, and for converting the sensed light rays into optical data. A control circuit is provided and includes a memory for storing a first program for preparing correction data based on the optical data, and a second program for correcting image data, read from the developed image of the electro-developing recording medium, based on the correction data. The correction data is revised whenever the image data is read from the developed image of the electro-developing recording medium.

Preferably, the optical sensor is used to read the developed image of the electro-developing recording medium. The reference zone may be located at a leading side edge of an image recording area of the electro-developing recording medium in a reading direction in which the electro-developing recording medium is intermittently moved with respect to the optical sensor during the optical and electronic reading of the developed image thereof by the optical sensor.

In the first and second aspects of the present invention, the electro-developing recording medium comprises an electrostatic information recording medium and an electric charge keeping medium, and the reference zone is formed in the electric charge keeping medium which may be constructed as a liquid crystal display. The reference zone may be defined as an empty space from which a portion of a liquid crystal of the liquid crystal display in eliminated. Also, the reference zone may be defined as a plenum space which is filled with a portion of a liquid crystal of the liquid crystal display, and which is arranged such that an electric field is applied to the plenum space so as to exhibit a constant and maximum transparency.

In accordance with a third aspect of the present invention, there is provided an electro-developing recording medium having a reference zone exhibiting a substantially-constant transparency to prepare correction data for correcting image pixel signals obtained by an optical and electronic reading of a developed image of the electro-developing recording medium.

Preferably, the reference zone is located at a margin area of an image recording area of the electro-developing recording medium. More preferably, the reference zone is located adjacent to a side edge of the image recording area of the electro-developing recording medium.

In accordance with a fourth aspect of the present invention, an electro-developing recording medium is provided including an electrostatic information recording medium and an electric charge keeping medium, wherein the electric charge keeping medium has a reference zone exhibiting a substantially-constant transparency to prepare correction data for correcting image pixel signals obtained by an optical and electronic reading of a developed image of the electro-developing recording medium.

Preferably, the reference zone is located at a margin area of an image recording area of the electric charge keeping medium. More preferably, the reference zone is located adjacent to a side edge of the image recording area of the electro-developing recording medium.

In the fourth aspect of the present invention, the electric charge keeping medium may be formed as a liquid crystal display. In this case, the reference zone may be defined as an empty space from which a portion of a liquid crystal of the liquid crystal display is eliminated. Also, the reference zone may be defined as a plenum space which is filled with a portion of a liquid crystal of the liquid crystal display, and which is arranged such that an electric field is applied to the plenum space so as to exhibit a constant and maximum transparency.

BRIEF DESCRIPTION OF THE DRAWINGS

These objects and other objects of the present invention will be better understood from the following description, with reference to the accompanying drawings in which:

FIG. 14 is an elevation view showing another type of holder for the electro-developing recording medium according to the present invention;

FIG. 15 is a plan view of the holder shown in FIG. 14;

FIG. 16 is an elevation view showing yet another type of holder for the electro-developing recording medium according to the present invention;

FIG. 17 is a plan view of the holder shown in FIG. 16;

DESCRIPTION OF THE PREFERRED EMBODIMENTS

Figure 1:
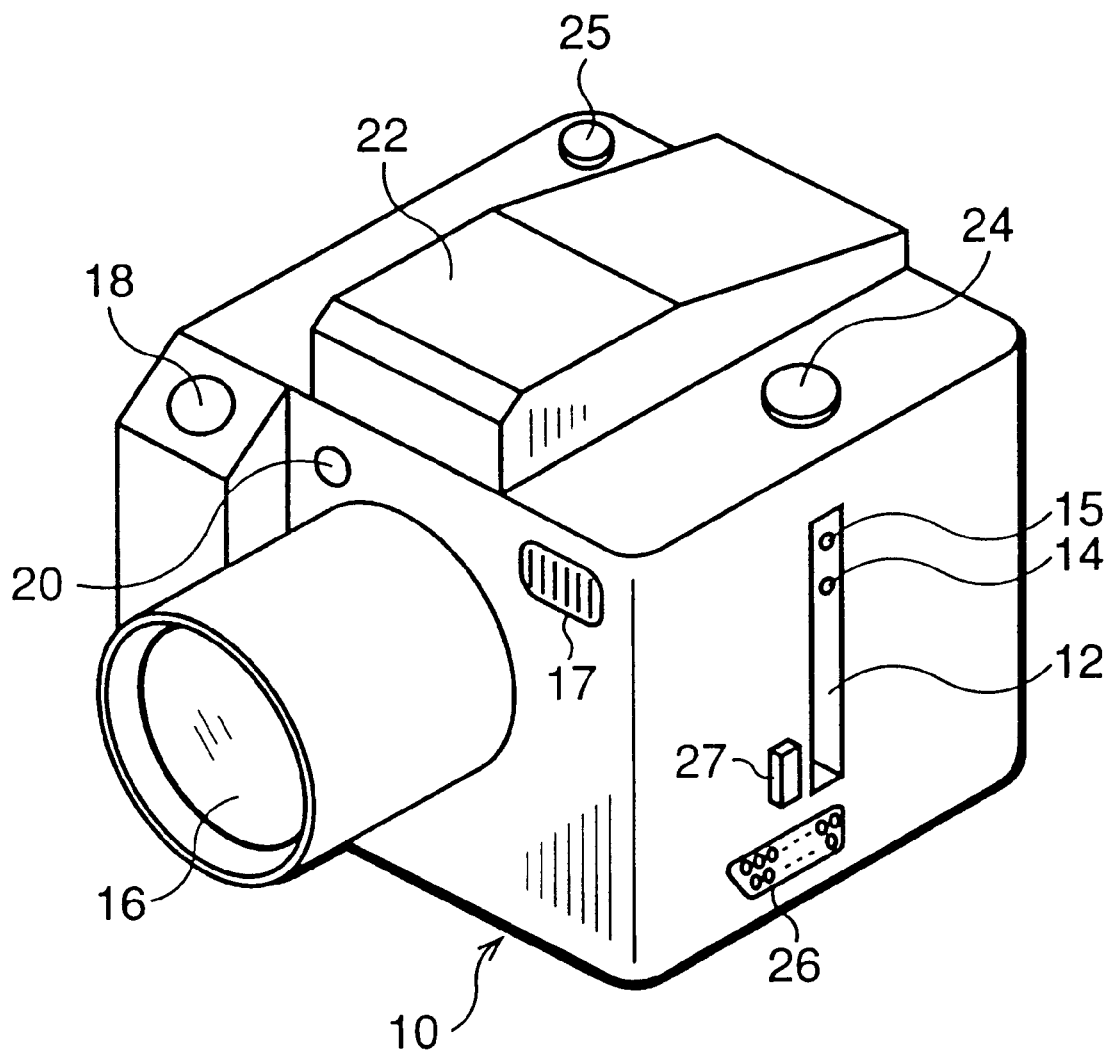
FIG. 1 is a schematic perspective view illustrating an electro-developing type camera having an image reader according to the present invention.

FIG. 1 is an external view of an electro-developing type camera constituted as an electronic still video camera and including an image reader according to the present invention. The camera comprises a camera body 10 having an elongated slot 12 formed in a side wall thereof, and a holder 13 (FIG. 3) for an electro-developing recording medium RM (FIG. 3) is inserted into the slot 12 such that the electro-developing recording medium RM hold therein is positioned and loaded at a given position in the camera body 10.

As shown in FIG. 1, a holder-detecting sensor 14 and a holder-positioning sensor 15 are provided on an inner side wall of the slot 12 beside an entrance port thereof. The holder-detecting sensor 14 is utilized to detect an insertion of the holder 13 into the slot 12 of the camera body 10, and the holder-positioning sensor 15 is utilized to position the electro-developing recording medium RM held by the holder 13 at the given position in the camera body 10.

When viewing the camera body 10 from a front side thereof, a photographing optical system 16 is provided at an approximately central location on a front surface of the camera body 10, and an electronic flash 17 is disposed on the front surface of the camera body 10 to the right side of and above the photographing optical system 16. A release switch 18 and a photometry sensor 20 are provided on the front, on the opposite side of the photographing optical system 16 relative to the electronic flash 17.

A view finder 22 in provided centrally on the top surface of the camera body 10. A scan start switch 24 is provided on the top surface, to one side of the view finder 22, and a main switch 25 is provided on the other side of the view finder 22. Further, an output terminal connector 26 is provided in the side wall of the camera in which the elongated slot 11 is formed, so that an image signal obtained by the camera can be outputted to an external recording device.

Note, in FIG. 1, reference numeral 27 indicates a holder ejecting switch for ejecting and unloading the holder of the electro-developing recording medium from the camera body 10 through the elongated slot 12 thereof.

Figure 2:
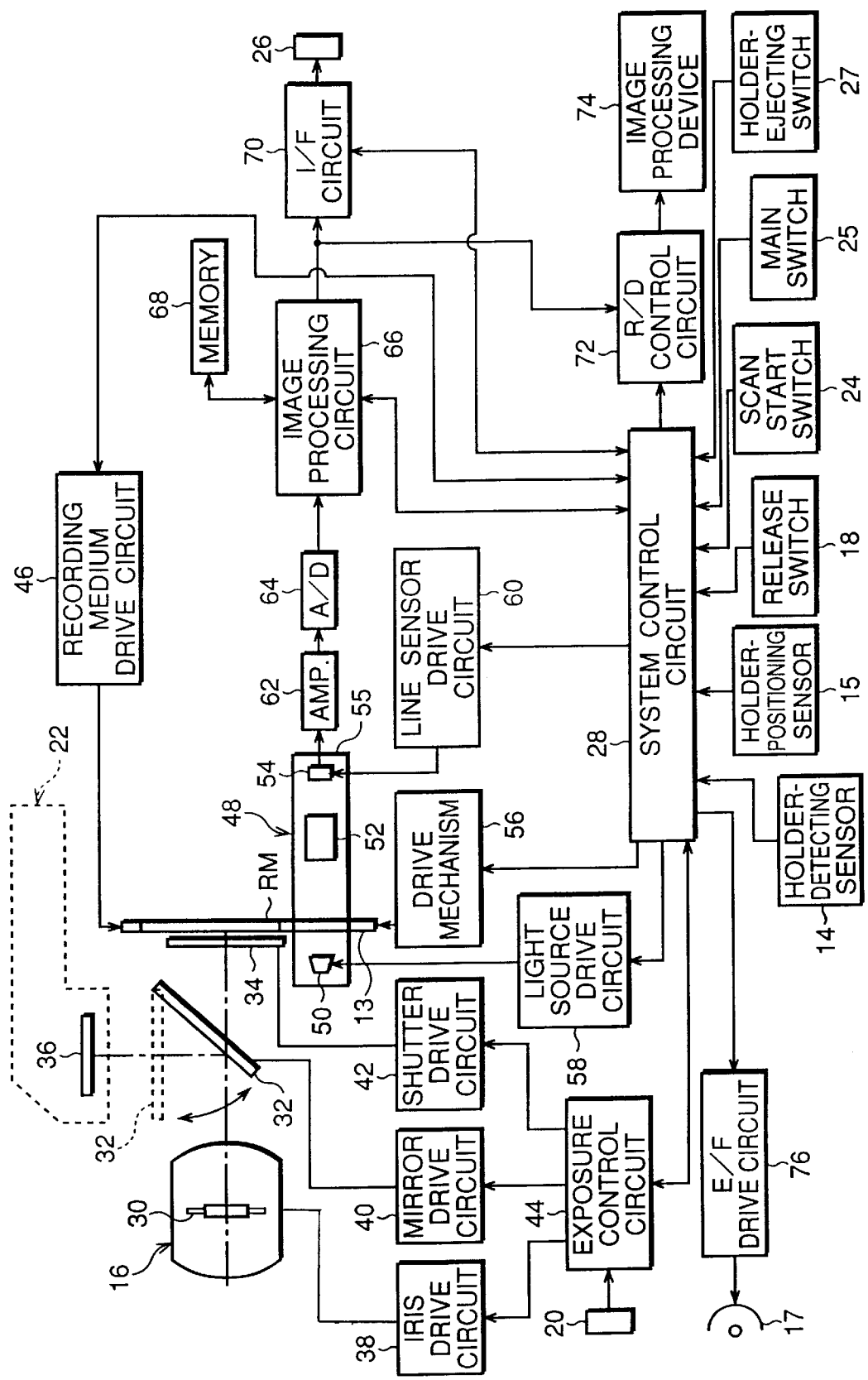
FIG. 2 is a block diagram of the electro-developing type camera according to the present invention.

FIG. 2 shows a block diagram of an embodiment of the electro-developing type camera according to the present invention. A system control circuit 28, which includes a microcomputer or microprocessor, a read-only memory (ROM), and a random-access-memory (RAM), etc., is provided to control the electro-developing type camera.

The photographing optical system 16 has a plurality of lens groups and a diaphragm 30 incorporated therein, and the electro-developing recording medium RM held in the holder 13 (FIG. 3) is disposed behind the photographing optical system 16. A quick return mirror 32 is placed between the photographing optical system 16 and the electro-developing recording medium RM, and a shutter 34 is provided between the quick return mirror 32 and the electro-developing recording medium RM. A focussing glass 36 is included in a view finder optical system of the view finder 22 and is disposed above the quick return mirror 32.

The diaphragm 30, the quick return mirror 32 and the shutter 34 are driven by an iris drive circuit 38, a mirror drive circuit 40, and a shutter drive circuit 42, respectively, and these drive circuits 38, 40, and 42 are controlled by an exposure control circuit 44 which is operated in accordance with a command signal outputted from the system control circuit 28.

During an exposure operation, the aperture size defined by the diaphragm 30 is adjusted by the iris drive circuit 38 under control of the exposure control circuit 44 based on an output signal of the photometry sensor 20.

The quick return mirror 32 to usually in a down-position (the inclined position shown by the solid lines in FIG. 2), and thus light beams passing through the photographing optical system 16 are directed to the optical system of the viewfinder 22, so that an object to be photographed can be observed through the viewfinder 22 by a photographer. When a photographing operation is executed, the quick return mirror 32 is rotated upward by the mirror drive circuit 40 to an up-position (the horizontal position shown by the broken lines in FIG. 2), so that the light beams are directed to the shutter 34.

The shutter 34 is normally closed, however, when taking a photograph, and the shutter 34 is opened for a predetermined period of time by the shutter drive circuit 42 under control of the exposure control circuit 44. Thus, during the photographing operation, the light beams, passing through the photographing optical system 16 and an open area of the shutter 34, is directed to a light receiving surface of the electro-developing recording medium RM. Namely, by rotating the quick return mirror 42 from the down position to the up-position, and by opening the shutter 34, an optical image to be photographed by the photographing optical system 16 is focussed on the light receiving surface of the electro-developing recording medium RM.

A voltage is applied to the electro-developing recording medium RM under control of a recording medium drive circuit 46, which is operated in accordance with a command signal outputted by the system control circuit 28. By exposing the electro-developing recording medium RM while applying the voltage, the optical image obtained by the photographing optical system 16 is developed in the electro-developing recording medium RM as a visible image.

An image reader 48 is provided in the camera body 10 in the vicinity of the electro-developing recording medium RM positioned in the camera body 10. The image reader 48 executes a reading operation for electronically reading the developed image of the electro-developing recording medium RM. The image reader 48 is provided with a linear light source 50, a focussing lens system 52, and a line image-sensor 54, all of which are aligned with each other.

Figure 3:
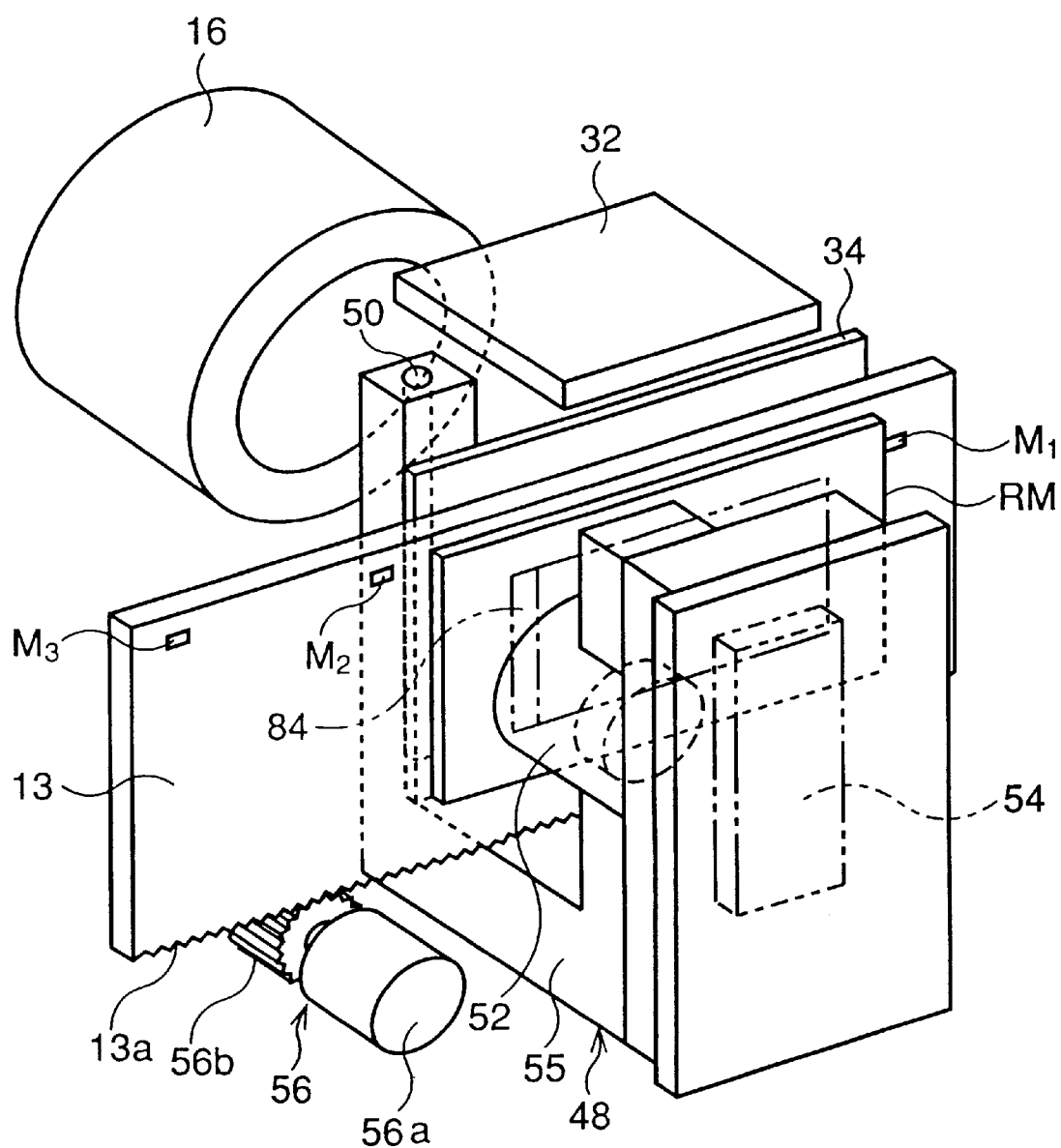
FIG. 3 is a schematic perspective view showing an image reader according to the present invention.

In particular, as best shown in FIG. 3, the image reader 48 comprises a U-shaped frame member 55, by which the linear light source 50, the focussing lens system 52, and the line image-sensor 54 are supported so as to be aligned with each other. The holder 13 is movable between the linear light source 50 and the focussing lens system 52, and can be stopped such that the electro-developing recording medium RM held thereby is aligned with the photographing optical system 16 i.e., such that a center of the recording medium RM is coincident with an optical axis of the photographing optical system 16.

The linear light source 50 is arranged at the front side of the shutter 34 and the electro-developing recording medium RM such that it does not interfere with a formation of the optical image on the light receiving surface of the electro-developing recording medium RM aligned with the photographing optical system 16. The linear light source 50 includes, for example, an LED (light emitting diode) array having a plurality of light emitting diodes aligned with each other, and a collimating lens for converting the light rays emitted therefrom, into parallel light rays. These elements are arranged so as to form a linear light emitting surface. Of course, the linear light source 50 may comprises another type of light emitting device such as a fluorescent lamp in place of the LED array.

The focussing lens system 52 and the line sensor 54 are arranged behind the electro-developing recording medium RM. The line sensor 54 is constructed as a one-dimensional CCD sensor having for example 2,000 pixel elements which form a linear light receiving surface. The parallel light rays emitted from the linear light source 50 are focussed on the linear light receiving surface of the line sensor 54 by the focussing lens system 52.

As is apparent from FIG. 3, the holder 13 for the electro-developing recording medium RM in provided with three detective marks $M_1$, $M_2$, and $M_3$ formed thereon or adhered thereto. The detective mark $M_1$ is arranged at a predetermined position so as to be detected by the holder-detecting sensor 14, and each of the detective marks $M_2$ and $M_3$ are arranged at a predetermined position so an to be detected by the holder-positioning sensor 15.

In the case where both the holder-detecting sensor 14 and the holer-positioning sensor 15 are constructed as an optical sensor, each of the detective marks $M_1$, $M_2$, and $M_3$ may be formed as a light-reflecting area. Alternatively, if each of the sensors 14 and 15 is constructed as a magnetic sensor, each of the detective marks $M_1$, $M_2$, and $M_3$ may be formed as a magnetic area. Of course, it should be understood that any type of sensors may be used as long as the corresponding detective mark can be detected thereby.

The image reader 48 is also provided with a drive mechanism 56 for driving and moving the holder 13 upon insertion of the holder into the slot 12 of the camera body 10. As shown in FIG. 3, the drive mechanism 56 including a drive motor 56a such as a stepping motor, a servo motor, or the like, and a pinion 56b mounted on an output shaft of the drive motor 56a. The pinion 56b is engaged with a rack 13a formed along an lower edge of the holder 13.

Although is not illustrated, a suitable clutch may be interposed between the pinion 56b and the output shaft of the drive motor 56a. Accordingly, the drive motor 56a is only enabled to transmit a rotational drive force to the pinion 56b through the output shaft thereof when the clutch is turned ON. In other words, when the clutch is turned OFF, the pinion 56b is free to rotate around the output shaft of the drive motor 56a.

The drive motor 56a of the drive mechanism 56 includes a drive circuit built therein, and the drive circuit outputs drive pluses to the drive motor 56a in accordance with a command signal outputted from the system control circuit 28. Thus, when the rack 13a of the holder 13 is engaged with the pinion 56b, and when the above-mentioned clutch is turned ON, it is possible to move the holder 13 by driving the drive motor 56a.

As stated hereinafter in detail, the drive mechanism 56 has two functions. One of the two functions is to position the holder 13, manually inserted in the slot 12 of the camera body 10, at a photographing position, such that an optical image obtained by the optical system 16 can be formed on the light-receiving surface of the recording medium RM at a proper location during an photographing operation. The other function is to intermittently move the holder 13 step by step so that a developed image of the electro-developing recording medium RM is scanned with light rays emitted from the light source 50, so an image-reading operation for optically and electronically reading the developed image of the recording medium RM can be carried out.

Note, in FIG. 2, although the holder 13 is shown as moveable in an upward and downward direction, it should be understood that the holder 13 is actually moved into and out of the paper with respect to the viewer of FIG. 2.

During the scanning operation or image-reading operation of the developed image from the electro-developing recording medium RM, the shutter 34 is opened, and the linear light source 50 is turned ON. The light rays passing through the recording medium RM, i.e., the light rays carrying image information of the developed image thereof, are focussed on the linear light receiving surface of the line sensor 54 by the focussing lens system 52. The line sensor 54 serves as a photoelectric-conversion device for sensing and converting the image information into electrical pixel signals. Of course, the light source 50 and the line sensor 54 are of suitable length to completely cover and extended over a width of a recording area of the recording medium RM. The electrical pixel signals are read out from the line sensor 54 during a movement of the holder 13 between the two adjacent scanning steps.

Control of the light source 50 (i.e., turning the light ON and OFF) is carried out by a light source drive circuit 58. The reading-out of the pixel signals from the line sensor 54 is controlled by a line sensor drive circuit 60. These drive circuits 58 and 60 are controlled by the system control circuit 28.

The pixel signals sensed by, and read out from, the line sensor 54 are amplified by an amplifier 62, and are then converted to digital pixel signals by an analog-to-digital (A/D) converter 64. The digital pixel signals are subjected to a gamma correction, and so on by an image processing circuit 66 under control of the system control circuit 28, and are then temporarily stored in a memory 68. The memory 68 may have a capacity for storing, for example, a single-frame of digital pixel signals obtained by a completion of the image-reading operation.

The pixel signals outputted from the memory 68 may be optionally inputted into an interface circuit 70 through the image processing circuit 66. In this case, the pixel signals are subjected to a given process such as a format-conversion process and so on, and are then transferred from the interface circuit 70 to, for example, an external monitor device (not shown) through the output terminal connector 26.

Also, the pixel signals outputted from the image process circuit 66 may be recorded on, for example, a second recording medium, such as an IC memory card, a floppy disk, a detachable hard disk, or the like, in an image recording (or processing) device 74 therefor. The pixel signals read out of the second recording medium may be transferred to an external processing device such as a personal computer, if necessary. In this case, the pixel signals are subjected to a given process such as an image-compression processing, a format-conversion processing in a recording device control circuit 72, and so on.

The interface circuit 70 and the recording device control circuit 72 are operated in accordance with command signals outputted from the system control circuit 28.

As shown in FIG. 2, the holder-detecting sensor 14 and the holder-positioning sensor 15 are connected to the system control circuit 28, and each of these sensors outputs a detecting signal to the control circuit 28 when the corresponding detective mark ($M_1$, $M_2$, or $M_3$) is detected. Also, the release switch 18 and the scan start switch 24 are connected to the system control circuit 28, and the photographing operation and the image-reading operation are carried out by turning the switches ON, respectively.

Further, the main switch 25 is connected to the system control circuit 28 to control ON and OFF settings of a main power source (not shown). Also, the holder-discharging switch 27 is connected to system control circuit 28, and the drive motor 56a is driven in reverse whenever the switch 27 is turned ON, whereby the holder 13 is discharged from the slot 12 of the camera body 10.

Furthermore, the electronic flash 17 is connected to the system control circuit 28 through an electronic flash drive circuit 76, which is associated with a flash-mode-selection switch (not shown). When a flash mode is selected by the flash-mode selection switch, the electronic flash drive circuit 76 is electrically charged. Then, when the release switch 18 is turned ON for photographing, the electronic flash 17 is electrically energized by the drive circuit 76.

Figure 4:
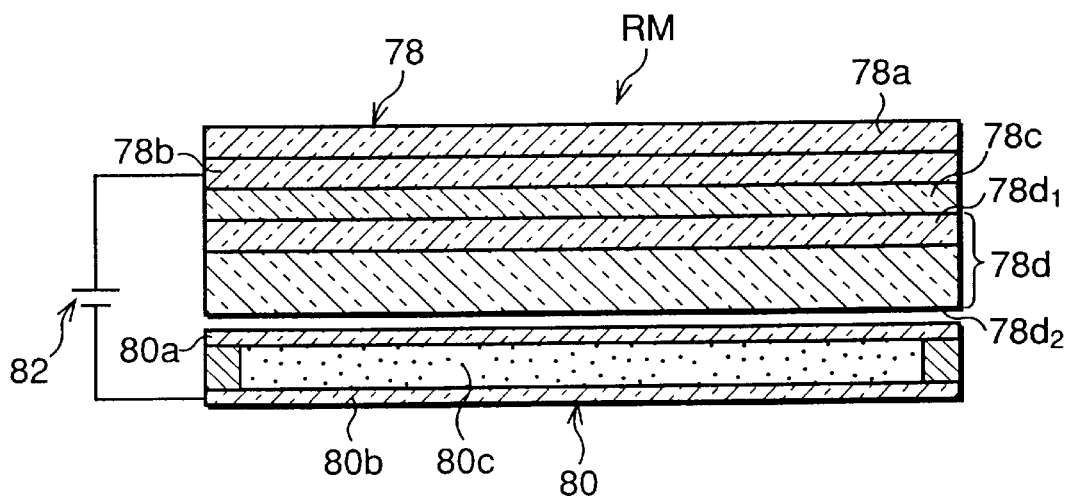
FIG. 4 is a cross sectional view showing a structure of an electro-developing recording medium used in an conventional electro-developing type camera.

FIG. 4 shows a structure of one type of the electro-developing recording medium RM which can be used in an electro-developing type camera. This type of recording-medium RM is identical with that disclosed in Japanese Unexamined Patent Publication No. 5-2280 and U.S. Pat. No. 5,424,156, the disclosures of which are expressly incorporated herein by reference in their entireties. The electro-developing recording medium RM comprises an electrostatic information recording medium 78 and an electric charge keeping medium 80, and a voltage is applied therebetween by an electric power source 82, illustrated symbolically in FIG. 3.

The electrostatic information recording medium 78 is formed by laminating a base plate 78a, an electrode layer 78b, an inorganic oxide material layer 78c and a photoconducting layer 78d. The photoconducting layer 78d is formed by laminating an electric charge generating layer $78d_1$ and an electric charge transferring layer $78d_2$.

The electric charge keeping medium 80 is constituted as a liquid crystal display which includes a liquid crystal supporting plate 80a, a liquid crystal electrode layer 80b, and a liquid crystal 80c intervened therebetween. Namely, the liquid crystal 80c is confined as a film-like layer between the supporting plate 80a and the electrode layer 80b.

In the example of the electro-developing recording medium RM shown in FIG. 4, the electric charge transferring layer $78d_2$ of the photoconducting layer 78d and the liquid crystal supporting plate 80a of the electric charge keeping medium 80 face each other with a small gap therebetween. As is apparent from FIG. 4, the whole structure of the electrostatic information recording medium 78 is transparent.

During photographing, the voltage signal is applied as an recording medium activating signal from the electric power source 82 to the electro-developing recording medium RM, i.e., between the electrode layer 78b of the electrostatic information recording medium 78 and the liquid crystal electrode layer 80b of the electric charge keeping medium 80. When an optical image to formed on the electrostatic information recording medium 78 by the photographing optical system 12 during the application of the voltage from the electric power source 82 thereto, an electric charge distribution is produced over the electrostatic information recording medium 78. The electric charge distribution is formed in accordance with a light intensity distribution of the optical image formed thereon, so that the intensity of an electric field, acting on the liquid crystal 80c of the electric charge keeping medium 80, is in accordance with the electric charge distribution.

Thus, the optical image obtained from the photographing optical system 12 is reproduced in the liquid crystal 80c as a visible image. Namely, as the optical image is formed on the electrostatic information recording medium 78, the image is developed in the electric charge keeping medium 80.

As is already stated hereinbefore, when the liquid crystal 80c is of a memory-type, such as smectic liquid crystal, the developed image can be kept in the electro-developing recording medium RM even if the electric field is eliminated therefrom.

Figure 5:
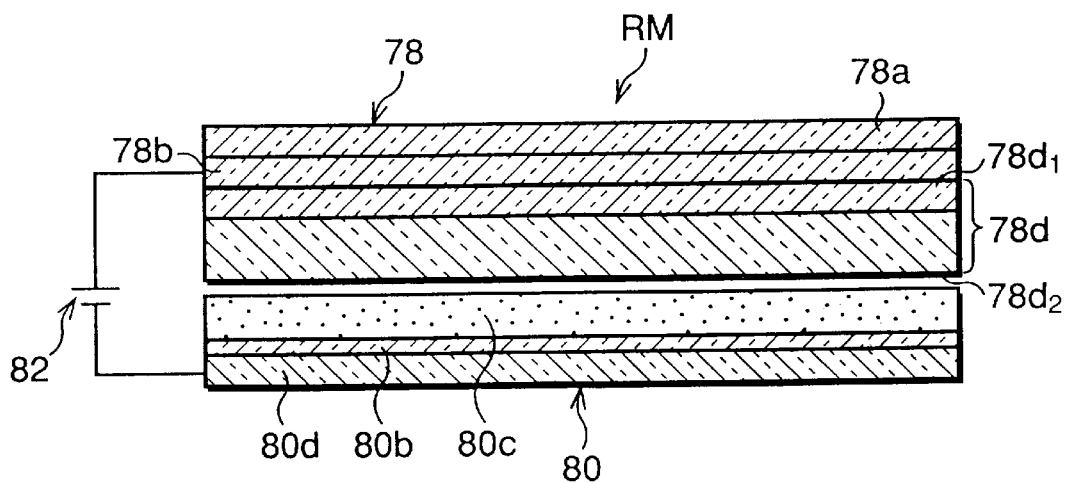
FIG. 5 is a cross sectional view showing another structure of an electro-developing recording medium used in an conventional electro-developing type camera.

FIG. 5 shows a structure of another type of electro-developing recording medium RM which can be used in an electro-developing type camera. This type of recording medium RM is identical with that disclosed in Japanese Unexamined Patent Publication No. 5-165005, the disclosure of which is expressly incorporated herein by reference in its entirety. In this drawing, the same references as used in FIG. 4 represent the same elements. The structure of the electrostatic information recording medium 78 is substantially identical with that shown in FIG. 4 except that the inorganic oxide layer 78c is omitted therefrom.

In FIG. 5, the electric charge keeping medium or liquid crystal display 80 is constituted as a liquid-crystal-polymer composite (LCPC) as disclosed in the above-mentioned publication. In particular, the liquid-crystal-polymer composite includes a polymer film having a plurality of spherical fine polymer elements dispersed over a surface thereof, and the polymer film is combined with the liquid crystal electrode 80b such that the spherical fine polymer elements are intervened therebetween, and supported on a transparent support plate 80d, such that a memory type of liquid crystal such a smectic liquid crystal is encapsulated in the space therebetween. Accordingly, once an optical image is developed in the electro-developing recording medium RM, the developed image can be kept in the electro-developing recording medium RM even if the electric field is eliminated therefrom.

Figure 6:
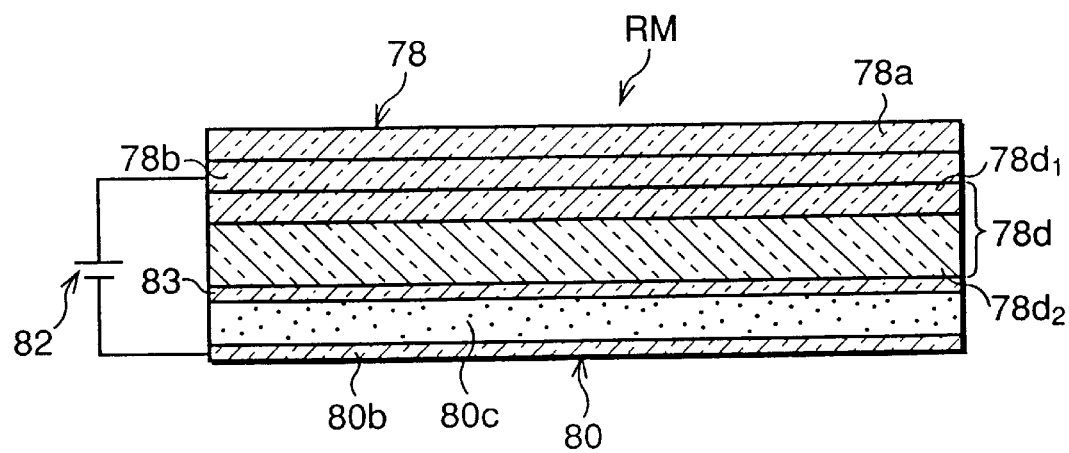
FIG. 6 is a cross sectional view showing yet another structure of an electro-developing recording medium used in an conventional electro-developing type camera.

FIG. 6 shown a structure of yet another type of electro-developing recording medium RM which can be used in an electro-developing type camera. In this drawing, the same references as used in FIG. 4 represent the same elements. Similar to the case of FIG. 5, the structure of the electrostatic information recording medium 78 is substantially identical with that shown in FIG. 3 except that the inorganic oxide layer 78c is omitted therefrom. Further, similar to the case of FIG. 5, the electric charge keeping medium or liquid crystal display 80 is constituted an the liquid-crystal-polymer composite (LCPC).

The electro-developing recording medium RM shown FIG. 6 is substantially the same as that of FIG. 5 except that the electrostatic information recording medium 78 and the electric charge keeping medium or liquid crystal display 80 are integrally combined with each other through the intermediary of an transparent insulating layer 83 without any gap therebetween.

Figure 7:
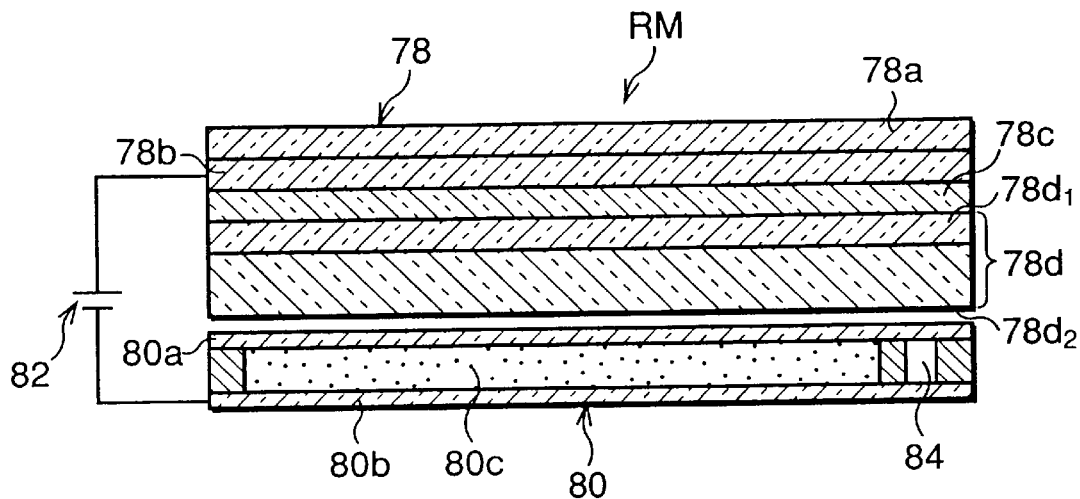
FIG. 7 is a cross sectional view showing a structure of a first embodiment of the electro-developing recording medium used in the electro-developing type camera according to the present invention.

FIG. 7 shows a structure of a first embodiment of the electro-developing recording medium RM used the electro-developing type camera according to the present invention, and this recording medium RM is derived from that of FIG. 4. Note, in FIG. 7, the same references used in FIG. 4 are used to represent the same elements.

As is apparent from FIG. 7, this electro-developing recording medium RM is the same as that of FIG. 4 except that the electric charge keeping medium or liquid crystal display 80 is formed with a reference zone 84 defined in a part of a margin area thereof. The reference zone 84 in utilized to prepare correction data for a shading correction of the light source 50, a photoelectric-conversion correction of the line image-sensor 54, and a transparency correction of the electro-developing recording medium RM. In this embodiment, the reference zone 84 is defined as an empty space from which a portion of the liquid crystal 80c is eliminated.

As is apparent from FIG. 3, the empty space or reference zone 84 is laterally extended to cover the width of the recording area of the electro-developing recording medium RM. Accordingly, when the reference zone 84 is in alignment with the linear light source 50, as shown in FIG. 3, the light rays emitted therefrom are transmitted through the reference zone 84, and are made incident upon the linear light receiving surface of the line image-sensor 54 by the focussing lens system 52.

The correction data for the shading correction of the light source 50, the photoelectric-conversion correction of the line image-sensor 54, and the transparency correction of the electro-developing recording medium RM shown in FIG. 7, which is prepared on the basis of the light rays passing through the reference zone 84, exhibits a high reliability, because the reference zone 84 of the electro-developing recording medium RM has a constant and invariable transparency due to the elimination of the liquid crystal therefrom.

Figure 8:
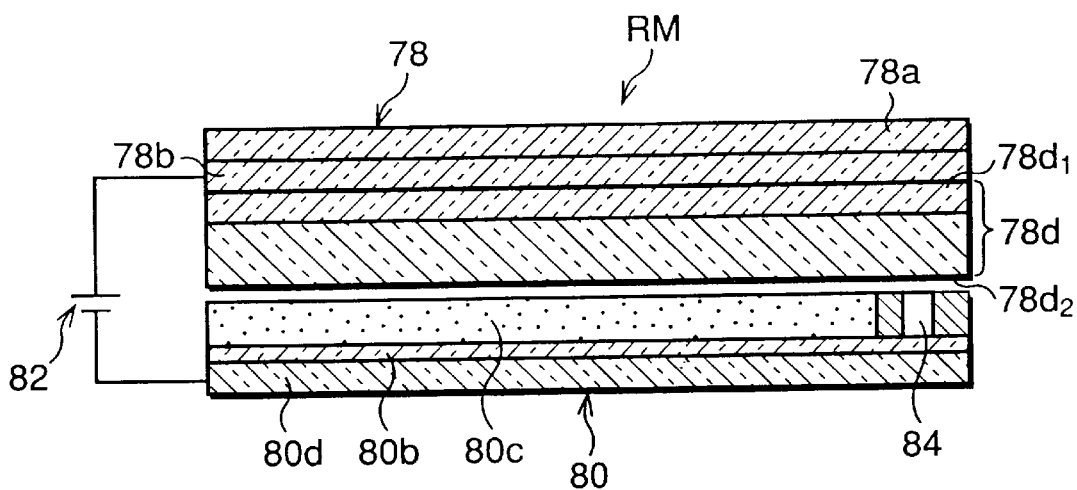
FIG. 8 is a cross sectional view showing another structure of the first embodiment of the electro-developing recording medium used in the electro-developing type camera according to the present invention.

FIG. 8 shows another structure of the first embodiment of the electro-developing recording medium RM used in the electro-developing type camera according to the present invention, and this recording medium RM is derived from that of FIG. 5. Note, in FIG. 8, the same references as used in FIG. 4 represents the same elements.

As is apparent from FIG. 8, this electro-developing recording medium RM is the same as that of FIG. 5 except that the electric charge keeping medium or liquid crystal display 80 is formed with a reference zone 84 defined in a part of a margin area thereof. Similar to the case of FIG. 7, the reference zone 84 is utilized to prepare correction data for a shading correction of the light source 50, a photoelectric-conversion correction of the line image-sensor 54, and a transparency correction of the electro-developing recording medium RM.

Also, similar to the structure of FIG. 7, the reference zone 84 is defined as an empty space from which a portion of the liquid crystal 80c is eliminated, and the empty space or reference zone 84 is laterally extended to cover the width of the recording area of the electro-developing recording medium RM. Accordingly, when the reference zone 84 is in alignment with the linear light source 50, as shown in FIG. 3, the light rays emitted therefrom are transmitted through the reference zone 84, and are made incident upon the linear light receiving surface of the line image-sensor 54 by the focussing lens system 52.

Further, similar to the structure of FIG. 7, the correction data for the shading correction of the light source 50, the photoelectric-conversion correction of the line image-sensor 54, and the transparency correction of the electro-developing recording medium RM, which is prepared on the basis of the light rays passing through the reference zone 84, exhibits a high reliability, because the reference zone 84 of the electro-developing recording medium RM shown in FIG. 8 has a constant and invariable transparency due to the elimination of the liquid crystal therefrom.

Figure 9:
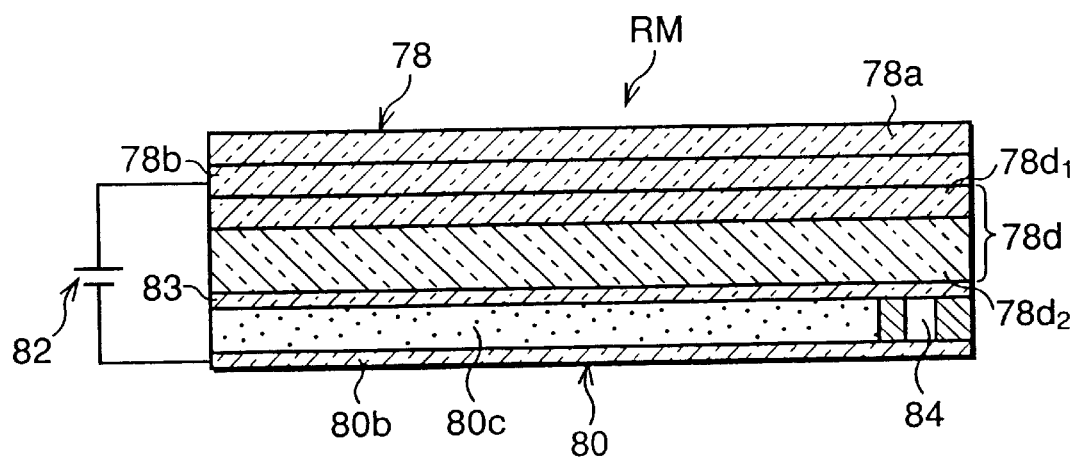
FIG. 9 is a cross sectional view showing yet another structure of the first embodiment of the electro-developing recording medium used in the electro-developing type camera according to the present invention.

FIG. 9 shows yet another structure of the first embodiment of the electro-developing recording medium RM used in the electro-developing type camera according to the present invention, and this recording medium RM is derived from that of FIG. 6. Note, in FIG. 9, the same references as used in FIG. 4 are used to represent similar elements.

As is apparent from FIG. 9, this electro-developing recording medium RM to the same as that of FIG. 6 except that the electric charge keeping medium or liquid crystal display 80 is formed with a reference zone 84 defined in a part of a margin area thereof. Similar to the case of FIG. 7, the reference zone 84 in utilized to prepare correction data for a shading correction of the light source 50, a photoelectric-conversion correction of the line image-sensor 54, and a transparency correction of the electro-developing recording medium RM.

Also, similar to the structure of FIG. 7, the reference zone 84 is defined as an empty space from which a portion of the liquid crystal 80c is eliminated, and the empty space or reference zone 84 to laterally extended to cover the width of the recording area of the electro-developing recording medium RM. Accordingly, when the reference zone 84 is in alignment with the linear light source 50, as shown in FIG. 3, the light rays emitted therefrom are transmitted through the reference zone 84, and are made incident upon the linear light receiving surface of the line image-sensor 54 by the focussing lens system 52.

Further, similar to the structure of FIG. 7, the correction data for the shading correction of the light source 50, the photoelectric-conversion correction of the line image-sensor 54, and the transparency correction of the electro-developing recording medium RM, which is prepared on the basis of the light rays passing through the reference zone 84, exhibits a high reliability, because the reference zone 84 of the electro-developing recording medium RM shown in FIG. 9 has a constant and invariable transparency due to the elimination of the liquid crystal therefrom.

A photographing operation of the electro-developing type camera as mentioned above will be now explained below.

First, the main switch 25 is turned ON, and then the holder 13 for the electro-developing recording medium RM is manually inserted into the camera body 10 through the slot 12 thereof. Just after the insertion of the holder 13 into the slot 12, the rack 13a of the holder 13 is engaged with the pinion 56b of the driving mechanism 56, and the detective mark $M_1$ is detected by the holder-detecting sensor 14. The engagement of the rack 13a with the pinion 56b can be smoothly carried out because the clutch between the output shaft of the motor 65a and the pinion 56b to turned OFF. As soon as the detection of the detective mark $M_1$ by the holder-detecting sensor 14 is performed, the clutch is turned ON, and the drive motor 56a is driven forward to bring the holder 13 into the camera body 10.

Then, when the detective mark $M_2$ is detected by the holder-positioning sensor 15, the drive motor 56a of the drive mechanism 56 is stopped so that the electro-developing recording medium RM is in alignment with the photographing optical system 16. Namely, the recording medium RM is positioned at the photographing position. Thus, it is possible to carry out the photographing operation by turning the release switch 18 ON.

When the release switch 18 is turned ON, an output signal of the photometry sensor 20, i.e., a photometry value is sensed and fetched by the system control circuit 28, and an exposure calculation is started on the basis of the fetched photometry value. After a predetermined period of time has elapsed from the ON operation of the release switch 18, the recording medium activating signal is outputted from the recording medium drive circuit 46 to the electro-developing recording medium RM. Namely, the activating voltage is applied between the electrostatic information recording medium 78 and the electric charge keeping medium 80. Then, when the exposure calculation is completed, the sequence procedures necessary for photographing are carried out on the basis of the calculated result.

In particular, the aperture size of the diaphragm 30 is adjusted in accordance with the calculated result. Note, since the diaphragm 30 initially has a fully-opened aperture size, the adjustment of the diaphragm 30 is performed such that diaphragm 30 is adjusted from the fully-opened aperture size to a small size. Then, the quick return mirror 32 is moved from the down-position (solid lines) to the up-position (broken lines). When it is confirmed that the adjustment of the diaphragm 30 and the movement of the quick return mirror 32 from the down-position to the up position are completed, the shutter 34 is opened, whereby an optical image is focussed and formed on the light receiving surface of the electro-developing recording medium RM.

When an exposure period of time, which is determined by the calculated result, has elapsed, i.e., when a given exposure is completed, the shutter 34 is closed. Then, the quick return mirror 32 is returned from the up-position to the down-position, and the aperture size of the diaphragm 30 is returned to the fully-open area. Successively, the output of the recording medium activating signal is stopped. Thus, the optical image obtained by the photographing optical system 16 is recorded and developed in the electric charge keeping medium or liquid crystal display 80.

The developed recording medium RM may be removed from the camera body 10 by turning the holder-ejecting switch 27 ON, if necessary. Namely, the holder-ejecting switch 27 is turned ON, the drive motor 56a is reversely driven for a predetermined period of time, and the clutch between the output shaft of the drive motor 56a and the pinion 56b is turned OFF. At this time, a part of the holder 13 is ejected from the slot 12 of the camera body 10, and thus the holder 13 can be pulled out of the camera body 10 through the slot 12 thereof by pinching the projected part with two fingers of a user.

On the other hand, after the photographing operation, the developed image of the electro-developing recording medium RM may be immediately read by actuating the image reader 48. This image-reading operation is carried out by turning the scan start switch 24 ON, and a preparation of correction data for a shading correction of the light source 50, a photoelectric-conversion correction of the line image-sensor 54, and a transparency correction of the electro-developing recording medium RM takes place in the image-reading operation.

Figure 10:
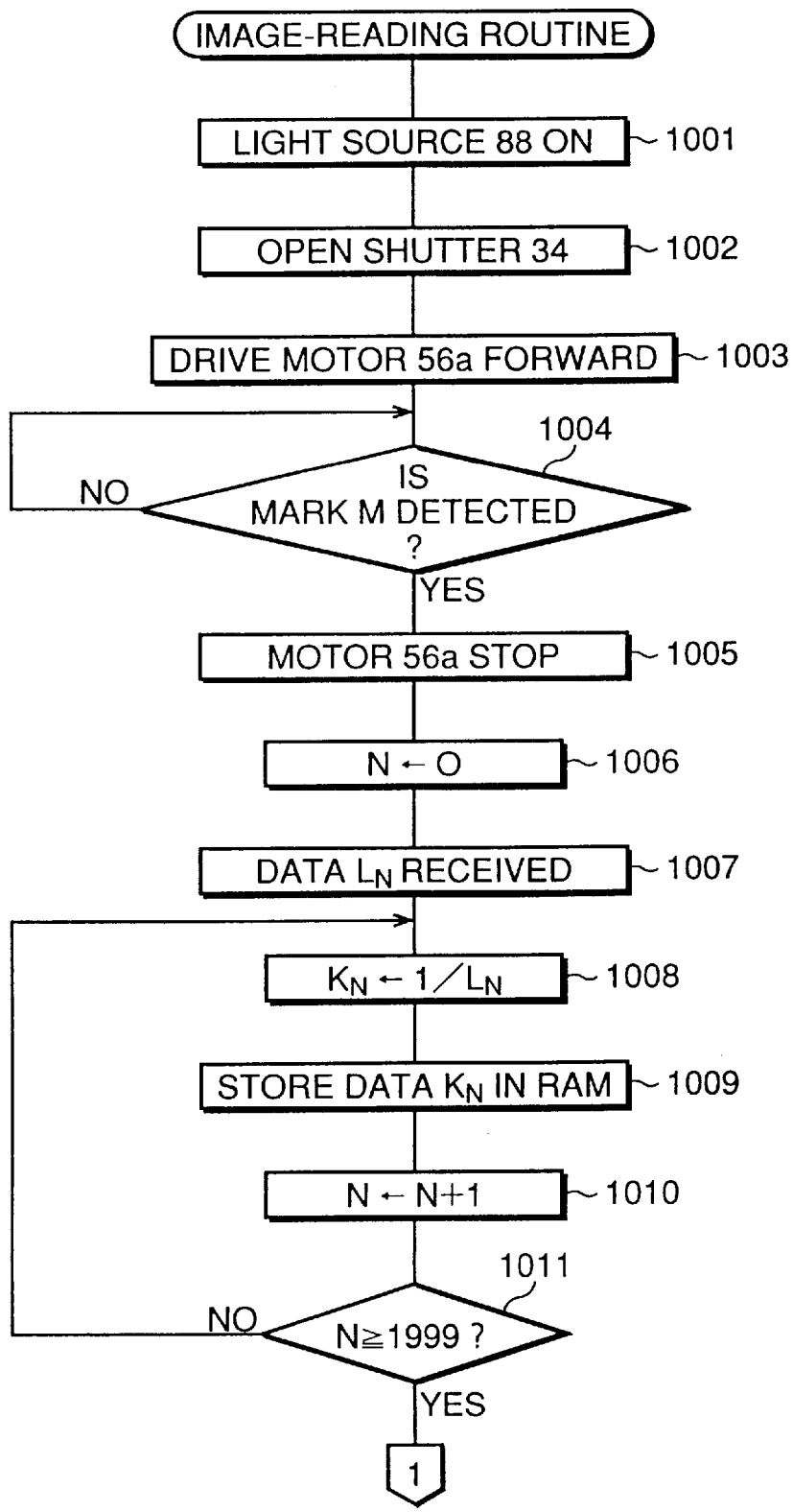
FIG. 10 is a part of a flowchart showing a routine for an image reading operation executed by the image reader according to the present invention.
Figure 11:
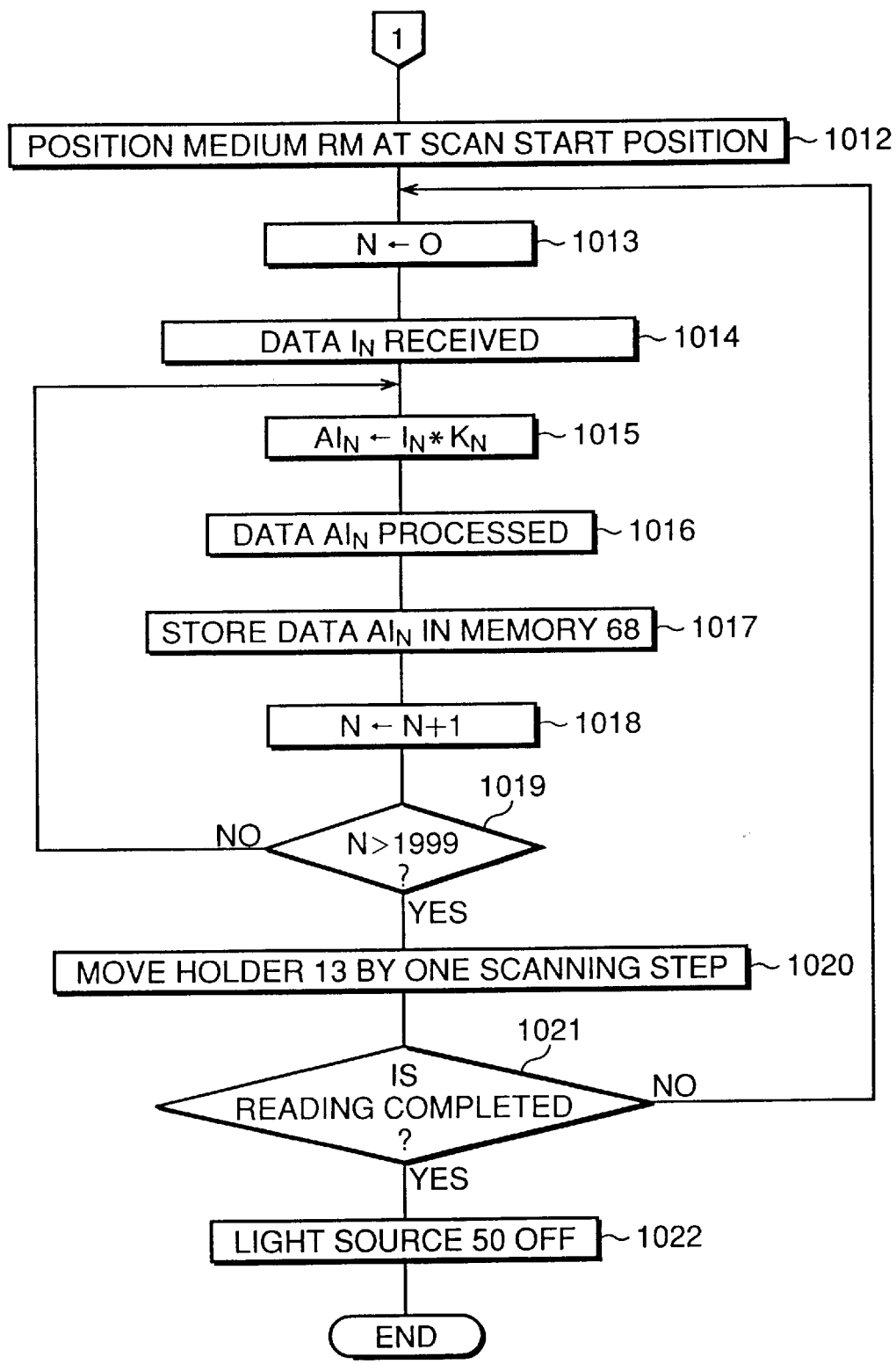
FIG. 11 is the remaining part of the flowchart showing the routine for the image reading operation executed by the image reader according to the present invention.

FIGS. 10 and 11 show a flowchart for obtaining the image-reading routine for optically and electronically reading the developed age of the electro-developing recording medium RM. This routine is executed whenever the scan start switch 24 is turned ON.

At step 1001, the light source 50 is turned ON by the light source drive circuit 58. Then, at step 1002, the shutter 34 is opened by the shutter drive circuit 42.

At step 1003, the drive motor 56a is driven a forward direction so that the holder 13 is further moved toward the inside of the camera body 10. At step 1004, it is determined whether the detective mark $M_3$ to detected by the holder-positioning sensor 15.

When the mark $M_3$ is detected by the holder-positioning senor 15, i.e., when the empty space or reference zone 84 of the electro-developing recording medium RM is aligned with the linear light source 50, as shown in FIG. 4, the routine proceeds from step 1004 to step 1005, in which the drive motor 56a is stopped. Thus, the light rays emitting from the light source 50 and passing through the reference zone 84 are made incident upon the light receiving surface of the line image-sensor 54 (having, for example, 2,000 pixel elements) by the focussing lens system 52.

At step 1006, an address counter "N" is reset. Then, at step 1007, 2,000 pixel signals corresponding to the number of pixel elements of the line image-sensor 54 are read out therefrom in accordance with shift clock signals outputted from the line sensor drive circuit 60 to the line image-sensor 54. Of course, the 2,000 pixel signals represent a shading characteristic of the light source 50 and photoelectric-conversion characteristics of the pixel elements of the line image-sensor 54. The respective 2,000 pixel signals are successively amplified by the amplifier 62, and are then converted into digital pixel data $L_N$ (N=0~1,999) by the A/D converter 64. Thereafter, the digital pixel data $L_N$ is received and fetched by the system control circuit 28 through the image processing circuit 66.

At step 1008, the following calculation is executed:

$$k_N \leftarrow 1/L_N$$

Namely, the reciprocal of the digital pixel data $L_N$ is calculated and prepared as correction data $k_N$. Then, at step 1009, the calculated correction data $k_N$ is temporarily stored in the RAM of the system control circuit 28.

At step 1010, the address counter N is incremented by "1". Then, at step 1011, it is determined whether or not the address counter N has reached "1,999", i.e., it is determined whether the preparation of the correction data $k_N$ is completed with respect to all of the 2,000 pixel elements of the line image-sensor 54. If N<1,999, the routine returns from step 1011 to step 1008.

At step 1011, when the address counter N has reached 1,999, i.e., when the preparation of the correction data $k_N$ is completed, the routine proceeds from step 1011 to step 1012, in which the drive motor 56a is reversely driven until the electro-developing recording medium RM held by the holder 13 is positioned at a scan start position at which the image reading operation is started by the image reader 48. Note, the positioning of the recording medium RM at the scan start position may be controlled by counting a number of drive pulses for driving the drive motor 56a.

At step 1013, the address counter is reset. Then, at step 1014, 2,000 image-pixel signals corresponding to the number of pixel elements of the line image-sensor 54 are read out therefrom in accordance with the shift clock signals outputted from the line sensor drive circuit 60 to the line image-sensor 54. Of course, the 2,000 image-pixel signals are derived from the light rays passing through the developed image of the electro-developing recording medium RM and carrying the image information thereof. The respective 2,000 image-pixel signals are successively amplified by the amplifier 62, and are then converted into digital image-pixel data $I_N$ (N=0~1,999) by the A/D converter 64. Thereafter, the digital image-pixel data $I_N$ are received and fetched by the system control circuit 28 through the image processing circuit 66.

At step 1015, the following calculation is executed:

$$AI_N \leftarrow I_N \times k_N$$

Namely, the digital image-pixel data $I_N$ as multiplied by the corresponding correction data $k_N$, and the product or corrected digital image-pixel data $AI_N$ is obtained.

At step 1016, the corrected digital image-pixel data $AI_N$ is subjected to a gamma correction, and so on by an image processing circuit 66, and is then temporarily stored in a memory 68. Then, at step 1017, the processed digital image-pixel data $AI_N$ is stored in the memory 68.

At step 1018, the address counter N is incremented by "1". Then, at step 1019, it is determined whether the address counter N has reached "1,999", i.e., it is determined whether all of the digital image-pixel data $I_N$ is corrected and processed. If N<1,999, the routine returns from step 1019 to step 1015.

At step 1019, When the address counter N has reached 1,999, i.e., when the correction and processing of the digital image-pixel data $I_N$ are completed, the routine proceeds from step 1019 to step 1020, in which step 1011 to step 1022, in which the drive motor 56a is reversely driven such that the holder 13 is intermittently moved by one scanning step. A pitch of the scanning steps corresponds to a number of scanning lines by which the image reader 48 reads the developed image of the electro-developing recording medium RM. Note, the intermittent movement of the holder 13 by one scanning step may be controlled by counting a number of driving pulses for driving the drive motor 56a.

At atop 1021, it is determined whether the developed image of the electro-developing recording medium RM is completely read by the image reader 48. If the reading or the developed image is incomplete, the routine returns from step 1021 to step 1013, and the scanning operation is repeated in the same manner as mentioned above.

At step 1020, it is confirmed that the reading of the developed image of the electro-developing recording medium RM is completed, the routine proceeds from step 1021 to step 1022, in which the light source 50 is turned OFF.

Figure 12:
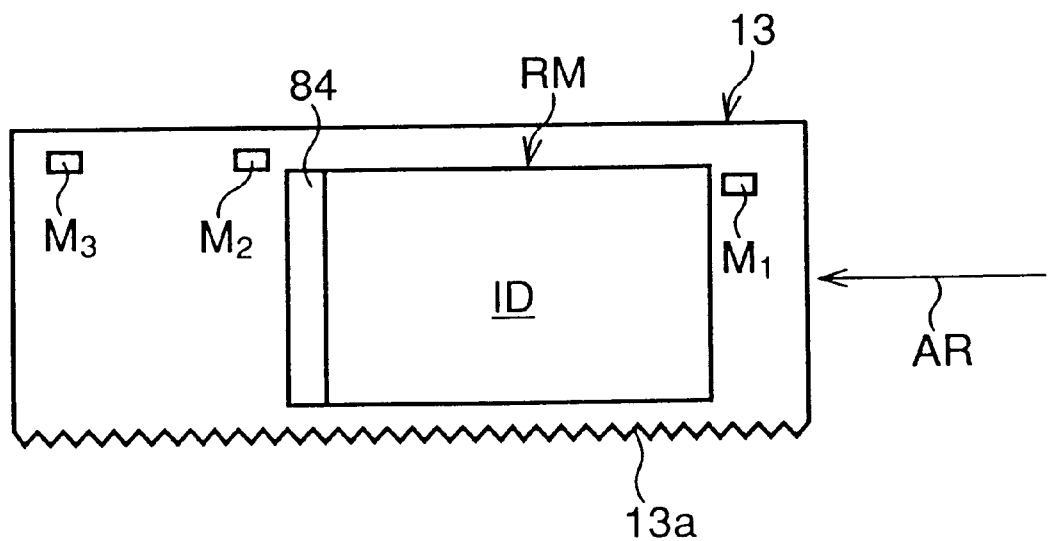
FIG. 12 is an elevation view showing one type of holder for the electro-developing recording medium according to the present invention.
Figure 13:
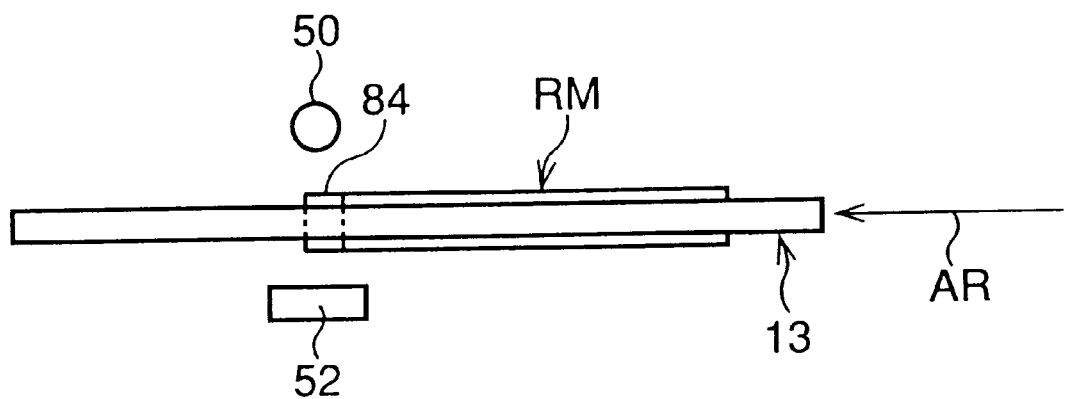
FIG. 13 is a plan view of the holder shown in FIG. 12.

FIGS. 12 and 13 show the holder 13 for the electro-developing recording medium RM. The insertion of the holder 13 into the slot 12 of the camera body 10 is carried out in such a manner that the side edge of the holder 13, to which the mark $M_1$ is applied, is defined as a leading side edge. Nevertheless, during the reading operation, the holder 13 is intermittently moved in the reverse direction indicated by an arrow AR in FIGS. 12 and 13. When this intermittent movement direction of the holder 13 is defined as a reading direction, the empty space or reference zone 84 is preferably located at a leading side edge of the image recording area, indicated by reference ID of the electro-developing recording medium RM in the reading direction. This is because the electro-developing recording medium RM can be promptly moved to the scan start position after the preparation of the correction data.

FIGS. 14 and 15 show another type of holder for the electro-developing recording medium RM, which is indicated by reference 13'. The holder 13' has an elongated shape, and holds three of the recording media arranged to be aligned with each other. An electro-developing type camera using the holder 13' is constituted such that the elongated holder 13' passes through the camera body thereof. As illustrated, the holer 13' has a rack 13a' formed along the lower edge thereof, and the rack 13a' can be engaged with the pinion 56b of the drive mechanism 56, whereby the holder 13' can be moved in the same manner as mentioned above.

As is apparent from FIGS. 14 and 15, during the reading operation, the holder 13' is intermittently moved in the reading direction as indicated by the arrow AR. Also, in each of the electro-developing recording media RM, the empty space or reference zone 84 is located at the leading side edge of the image recording area ID of the recording medium RM in the reading direction for the sane reasons as mentioned above.

FIGS. 16 and 17 show yet another type of holder for the electro-developing recording medium RM, which is substantially the same as shown in FIGS. 14 and 15 except that only one of the three recording media RM has the empty space or reference zone 84. Namely, the reference zone 84 is formed in only one of the recording media RM, which is defined as a leading medium in the reading direction AR, and the reference zone 84 is also located at the leading side edge of the image recording area ID of the recording medium RM concerned in the reading direction for the same reasons as mentioned above.

In the case of FIGS. 16 and 17, of course, the correction data ($k_N$) is prepared on the basis of the light rays passing through the reference zone 84, and are commonly used to correct image data obtained from each of the recording media RM.

Figure 18:
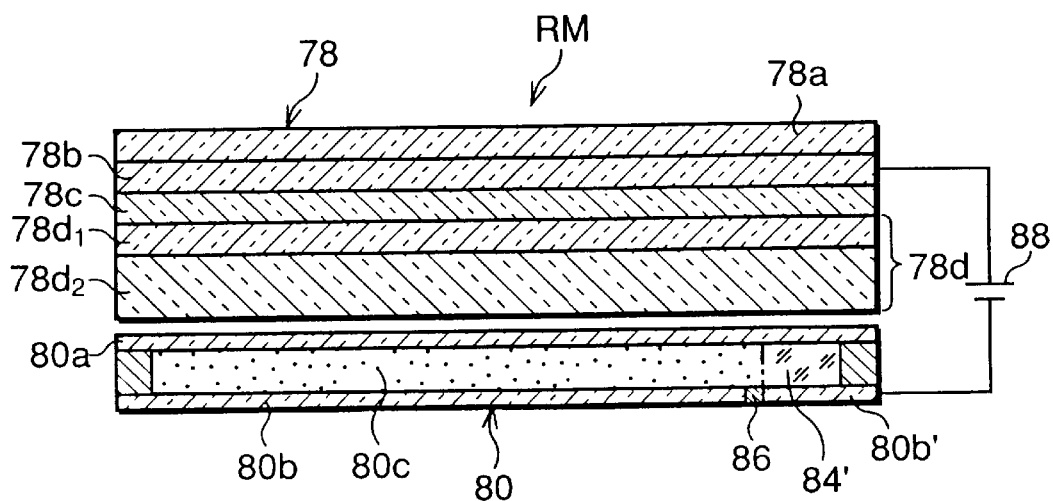
FIG. 18 to a cross sectional view showing a structure of a second embodiment of the electro-developing recording medium used in the electro-developing type camera according to the present invention.

FIG. 18 shows a structure of a second embodiment of the electro-developing recording medium RM used in the electro-developing type camera according to the present invention. Similar to the case of FIG. 7, this type of recording medium RM is also derived from that disclosed in Japanese Unexamined Patent Publication No. 5-2280 and U.S. Pat. No. 5,424,156 (FIG. 4). Namely, the electrostatic information recording medium 78 and the electric charge keeping medium 80 are substantially the same as shown in FIG. 7.

In this second embodiment, the reference zone 84' is formed as a plenum space in place of the empty space 84 shown in FIG. 7. In particular, the plenum space or reference zone 84' is filled with a portion of the liquid crystal 80c without the elimination of liquid crystal therefrom, and is defined by a transparent electrode segment 80b'. The transparent electrode segment 80b' is electrically independent from the liquid crystal electrode layer 80b. Namely, the transparent electrode segment 80b' is isolated from the liquid crystal electrode layer 80b by a dielectric material 86 surrounding the segment 80b'.

As shown in FIG. 18, Whenever the correction data ($k_N$) is prepared, a voltage is applied between the electrode layer 78b of the electrostatic information recording medium and the electrode segment 80b' by an electric power source 88 such that the plenum space or reference zone 84' exhibits a maximum transparency.

Similar to the empty space 84 shown FIG. 7, the plenum space 84' formed in a part of a margin area of the electric charge keeping medium or liquid crystal display 80, and is, of course, utilized to prepare the correction data for the shading correction of the light source 50, the photoelectric-conversion correction of the line image-sensor 54, and the transparency correction of the electro-developing recording medium RM. Also, the plenum apace 84' is laterally extended to cover the width of the recording area of the electro-developing recording medium RM. Accordingly, when the reference zone 84 is in alignment with the linear light source 50, the light rays emitted therefrom are transmitted through the plenum space or reference zone 84', and are focussed on the linear light receiving surface of the line image-sensor 54 by the focussing lens system 52.

The correction data for the shading correction of the light source 50, the photoelectric-conversion correction of the line image-sensor 54, and the transparency correction of the electro-developing recording medium RM, which is prepared on the basis of the light rays passing through the reference zone 84', also exhibits a high reliability, because a constant or invariable transparency of the plenum space or reference zone 84' can be ensured due to the application of voltage between the electrode layer 78b and the electrode segment 80b'. Note, the electro-developing recording medium RM as shown in FIG. 18 is superior to that of FIG. 7 because an age-deterioration of the liquid crystal 80c is taken into account in the preparation of the correction data.

Figure 19:
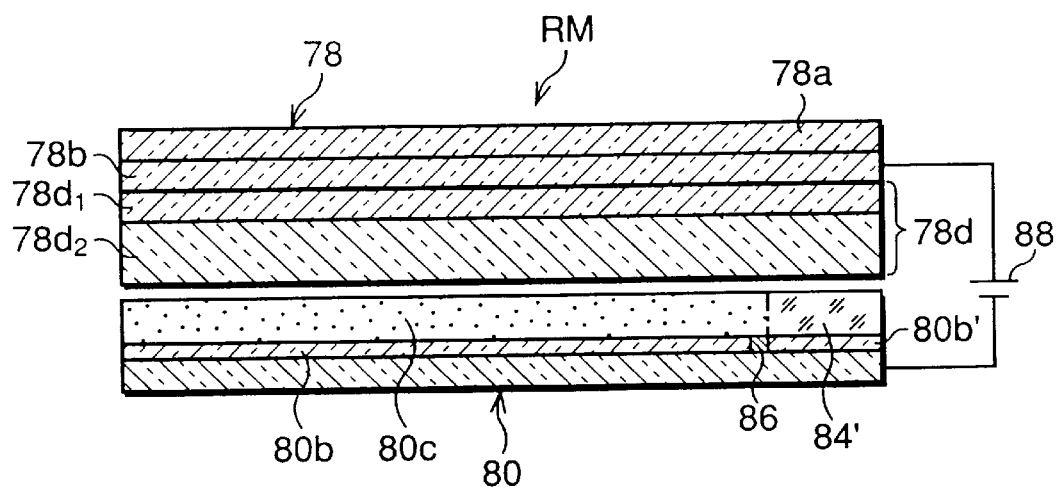
FIG. 19 to a cross sectional view showing another structure of the second embodiment of the electro-developing recording medium used in the electro-developing type camera according to the prevent invention.

FIG. 19 shown another structure of the second embodiment of the electro-developing recording medium RM used in the electro-developing type camera according to the present invention. Similar to the structure of the FIG. 8, this type of recording medium RM is also derived from that disclosed in Japanese Unexamined Patent Publication No. 5-165005 (FIG. 5). Namely, the electrostatic information recording medium 78 and the electric charge keeping medium 80 are substantially the same as shown in FIG. 5. As is apparent from FIG. 19, the plenum space or reference zone 84' is formed in the electric charge keeping medium or liquid crystal display 80 in the same manner as in the case of FIG. 18.

Figure 20:
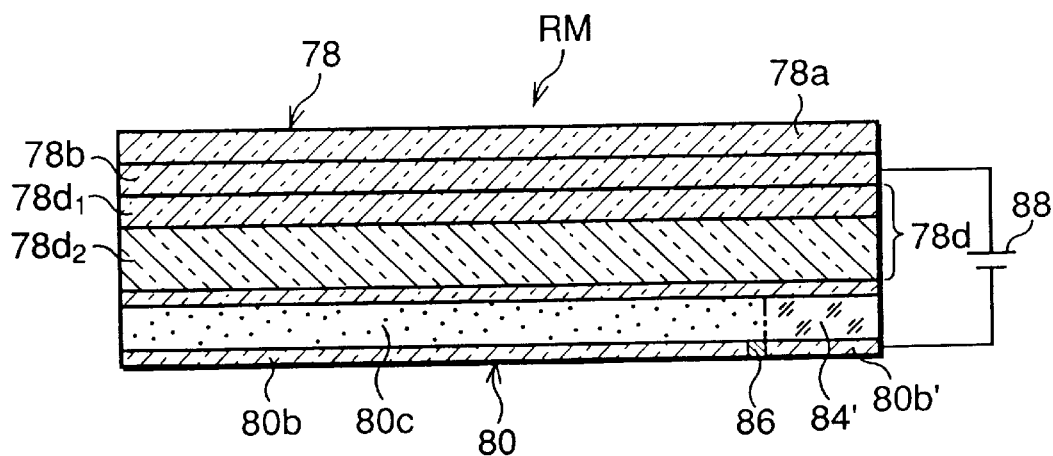
FIG. 20 is a cross sectional view showing yet another structure of the second embodiment of the electro-developing recording medium used in the electro-developing type camera according to the present invention.

FIG. 20 shows yet another structure of the second embodiment of the electro-developing recording medium RM used in the electro-developing type camera according to the present invention. Similar to the structure of FIG. 9, this type is also derived from that disclosed in Japanese Unexamined Patent Publications No. 6-130347 and No. 7-13132 (FIG. 6). Namely, the electrostatic information recording medium 78 and the electric charge keeping medium 80 are substantially the same as shown in FIG. 6. As is apparent from FIG. 20, the plenum space or reference zone 84' is formed in the electric charge keeping medium or liquid crystal display 80 in the same manner as in the case of FIG. 18.

As is apparent from the foregoing, according to the present invention, whenever a reading of a developed image from the electro-developing recording medium is executed, correction data for a shading correction of a light source, a photoelectric-conversion correction of an image sensor, and a transparency correction of the electro-developing recording medium is freshly prepared and renewed. Accordingly, the shading correction of the light source and the photoelectric-conversion correction of the image sensor can be properly and reliably can be carried out.

Finally, it will be understood by those skilled in the art that the foregoing description is of preferred embodiments of the present invention, and that various changes and modifications may be made to the present invention without departing from the spirit and scope thereof.

The present disclosure relates to subject matter contained in Japanese Patent Applications No. 7-293668 (filed on Oct. 16, 1995) and No. 8-134245 (filed on May 17, 1996), which are expressly incorporated herein, by reference, in their entirety.

We claim:

1. An image reader for optically and electronically reading a developed image of an electro-developing recording medium having an image-recording zone for recording the developed image and a reference zone, adjacent to the image-recording zone, the reference zone exhibiting a substantially-constant transparency, said image reader comprising:

an optical sensor that senses light rays passing through said reference zone, and that converts the sensed light rays into optical data, said optical sensor optically and electronically sensing the developed image of the electro-developing recording medium;

a preparation system that prepares correction data based on said optical data; and a correction system that corrects image data, read from said developed image of said electro-developing recording medium, based on the correction data, wherein the correction data is updated whenever the image data is read from the developed image of said electro-developing recording medium, said reference zone being located at a leading side edge of an image recording area of said electro-developing recording medium in a reading direction, in which said electro-developing recording medium is moved relative to said optical sensor during the optical and electronic reading of the developed image by said optical sensor.

2. An image reader as set forth in claim 1, said reference zone being defined and positioned in a part of a margin area of said electro-developing recording medium.

3. An image reader as set forth in claim 1, the movement of said electro-developing recording medium with respect to said optical sensor being intermittent.

4. An image reader as set forth in claim 1, wherein said electro-developing recording medium comprises an electro-static information recording medium and an electric charge keeping medium, and the reference zone is formed in said electric charge keeping medium.

5. An electro-developing recording medium as set forth in claim 4, wherein said electric charge keeping medium is formed as a liquid crystal display, and said reference zone is defined as an empty space from which a portion of a liquid crystal of the liquid crystal display is eliminated.

6. An electro-developing recording medium as set forth in claim 4, wherein said electric charge keeping medium is formed as a liquid crystal display, and said reference zone is defined as a plenum space which is filled with a portion of a liquid crystal of the liquid crystal display, and which is arranged such that an electric field is applied to said plenum space so as to exhibit a constant and maximum transparency.

7. An image reader for optically and electronically reading a developed image of an electro-developing recording medium having an image-recording zone for recording the developed image and a reference zone, adjacent to the image-recording zone, the reference zone exhibiting a substantially-constant transparency, said image reader comprising:

an optical sensor that senses light rays passing through said reference zone, and that converts the sensed light rays into optical data, said optical sensor optically and electronically sensing the developed image of said electro-developing recording medium; and a control circuit including a memory that stores a first program for preparing correction data based on said optical data, and a second program for correcting image data, read from the developing of said electro-developing recording medium, based on correction data, wherein the correction data is updated whenever the image data is read from the developed image of said electro-developing recording medium, said reference zone being located at a leading side edge of an image recording area of said electro-developing recording medium in a reading direction, in which said electro-developing recording medium is moved relative to said optical sensor during the optical and electronic reading of the developed image by said optical sensor.

8. An image reader as set forth in claim 7, said reference zone being defined and positioned in a part of a margin area of said electro-developing recording medium.

9. An image reader as set forth in claim 7, wherein the movement of said electro-developing recording medium with respect to said optical sensor being intermittent.

10. An image reader as set forth in claim 7, wherein said electro-developing recording medium comprises an electro-static information recording medium and an electric charge keeping medium, and the reference zone is formed in said electric charge keeping medium.

11. An electro-developing recording medium as set forth in claim 10, wherein said electric charge keeping medium is formed as a liquid crystal display, and said reference zone is defined as an empty space from which a portion of a liquid crystal of the liquid crystal display is eliminated.

12. An electro-developing recording medium as set forth in claim 10, wherein said electric charge keeping medium is formed as a liquid crystal display, and said reference zone is defined as a plenum space which is filled with a portion of a liquid crystal of the liquid crystal display, and which is arranged such that an electric field is applied to said plenum space so as to exhibit a constant and maximum transparency.

13. An image reader for optically and electronically reading a developed image of an electro-developing recording medium having an image recording zone for recording a developed image and a reference zone exhibiting a substantially constant transparency, said image reader comprising:

an optical sensor that senses light rays passing through said reference zone, said reference zone being positioned at a margin area of the image recording area of the electro-developing recording medium, said optical sensor converts the sensed light rays into optical data, said optical sensor optically and electronically sensing the developed image of said electro-developing recording medium;

a preparation system for preparing correction data based on said optical data; and a corrector that corrects image data, read from said developed image of said electro-developing recording medium, based on the correction data, said correction data being updated whenever the image data is read from the developed image of said electro-developing recording medium.

* * * * *